May 7, 1968     J. W. HEALY     3,382,133
MEANS FOR CORRUGATING WEBS TRANSVERSELY
Filed Feb. 26, 1965
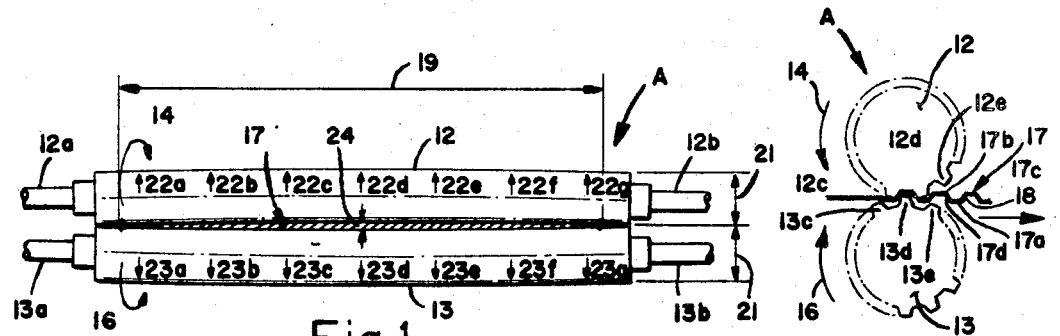
Fig 1
Fig 2
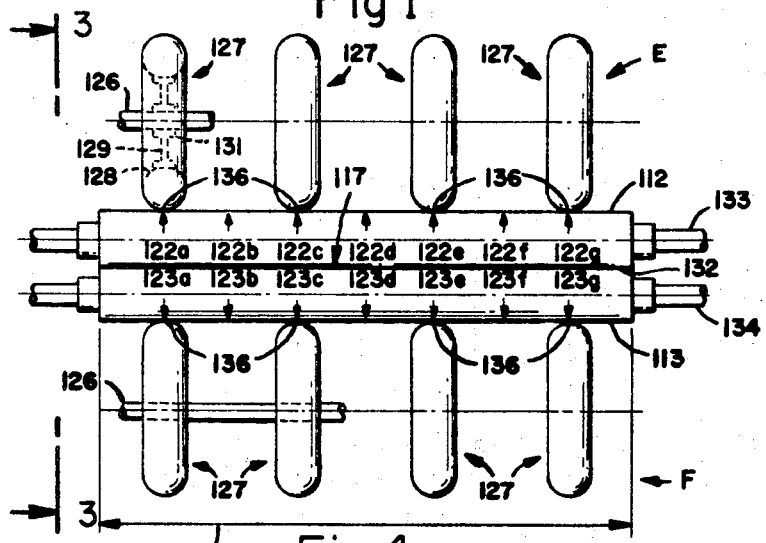
Fig 4
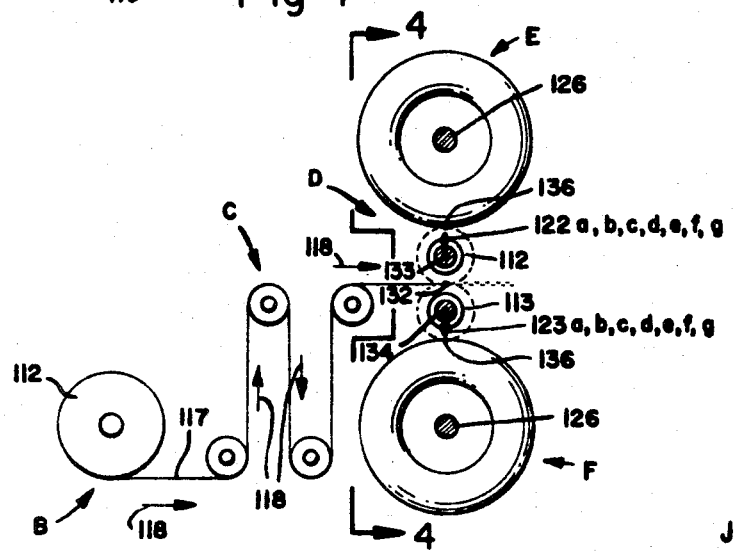
Fig 3
INVENTOR.
JAMES W. HEALY
BY
*Townsend & Townsend*
ATTORNEYS

3,382,133
MEANS FOR CORRUGATING WEBS TRANSVERSELY

James W. Healy, Wakefield, Mass., assignor to Arthur D. Little, Inc., Cambridge, Mass., a corporation of Massachusetts
Filed Feb. 26, 1965, Ser. No. 435,481
6 Claims. (Cl. 156—596)

ABSTRACT OF THE DISCLOSURE

Apparatus for minimizing the deflection of a pair of corrugating rolls during their use in the application of transverse corrugations to a formable sheet material passing between the rolls, including a pneumatic restraining member mounted for rotatable movement adjacent each of the corrugating rolls to cause the corrugating rolls to remain in relatively constant alignment during application of the corrugations.

---

This invention relates to the corrugating of formable materials in the manufacture of various types of honeycomb products. In particular, a novel structure is proposed to increase the effective widths of corrugating rolls that may be used for high density transverse corrugation, i.e., where the cell pitch of the finished honeycomb is relatively small and/or the ribbon material used is of a relatively heavy gauge.

Honeycomb is generally made by one of two basic methods: expansion, for example as described in the U.S. Patent to R. C. Steele, No. 2,610,934; or corrugation, for example, as shown in the U.S. Patent to Wentworth et al., No. 3,044,921. Also, some high density honeycomb, particularly that of the relatively heavy cell wall type, has been made using extrusion techniques.

The manufacture of relatively high density honeycomb by the expansion process is generally limited by the strength of the bond between adjacent ribbons which become the walls of the cells after expansion. This is so because the expansion force required to expand the pack and open the relatively large number of closely formed cells to form the honeycomb may be greater than the strength of the bond between adjacent ribbons; hence, upon expansion, the adjacent bonded ribbons may separate so as to destroy the product. Consequently, where a relatively high degree of cell density is required, other and different techniques, such as extrusion or corrugated honeycomb manufacture, are more commonly used.

Extrusion techniques, whereby metal stock is forced through a mandrel or die to produce the desired cellular cross-sectional product, involve somewhat high investments in dies and the like and are generally used only for high production volume and where relatively heavy walled cells are desired. Also, because of the high extrusion forces that are normally required, the extruded blocks are generally limited in their length, width and depth dimensions. This makes necessary further steps of joining small units together in order to obtain desired larger sections.

In the manufacture of high density core by corrugation, sheets of ribbon material are first formed into a continuous series of half cell profiles corresponding to the finished product, cut to desired shape, and then bonded to form the final honeycomb product. (Reference to corrugation, hereinafter is understood to mean transverse corrugation, i.e., corrugation across the sheet normal to the direction of travel through the corrugating rolls, although it is understood that this invention may be applied to certain types of longitudinal corrugating processes as well.) When the corrugating method of manufacture is used, the problem of expansion forces exceeding the bond strength between ribbons is obviated; and many of the limitations of the extrusion process are also avoided. In corrugating, however, a pair of rolls with mating flutes, shaped to define a given half cell profile, are rotated and engage therebetween the continuous web of material to be corrugated; and in so doing relatively high separation forces are created between the rolls. This may be aggravated even further when relatively heavy gauge material is being corrugated or where the pitch of the cells is relatively small as is the case in the manufacture of high density honeycomb. Moreover, the problem of separation is accentuated by the fact that many of the corrugation profiles require the use of tooth forms in opposite mating flutes which, unlike normal geared tooth forms, involve a greater degree of frictional drag which increases the separation force.

Because of the separation forces described above, if the corrugating rolls are of a width which is relatively great in respect to the roll diameter, the roll tends to be deflected with maximum separation toward the center thereof. Such separation causes corrugations to be impressed in the material which are not uniform throughout their transverse dimension along the web of the material being formed. Subsequently, when such material is cut to desired shape and stacked preparatory to a suitable operation of bonding, some of the adjacent nodes to be bonded are not in contact and hence an incomplete and unsatisfactory product results. Moreover, even if bonding is achieved, the cells are not uniform throughout the product which then exhibits uneven physical properties.

Thus, the generally practiced prior art techniques for the corrugating process of making honeycomb have an inherent limitation imposed upon them in respect to the width of corrugating roll that may be employed. As described above, this is due mainly to the deflection or bowing of the rolls arising from the separation forces between them.

One possible solution to this problem is to increase the diameter of the rolls in order to increase their lateral stiffness; however, this is limited not only by cost, physical space, and increased power requirements, but also by the nature of the corrugating process itself. If the roll diameters are made too large, the material is no longer rolled through by the nipping action of the rolls and folded back and forth between the forming flutes in a continuous non-destructive action; instead, the large rolls with their forming flutes act somewhat like a pair of converging, flat racks which tend to deform the material therebetween simultaneously at several points of mating flute engagement thereby tearing the material and destroying rather than forming the corrugated product.

Another possible solution to the problem of bowed corrugating rolls is to provide the rolls with a crown, i.e., increase of section toward the center of the roll which increases its stiffness to a miximum at the point of greatest possible deflection. One of the difficulties encountered here is that a different degree of crown is required for various separation forces. For example, different materials and gauges (within the usable range of a given flute or tooth profile) create various separation forces; and a different set of crown rollers, even for the same tooth profile, would be required for a number of different materials and gauges. Different crown rollers are also normally require for different widths of material being corrugated.

In certain other prior art systems, relatively smooth rolls which are subject to deflection are supported by adjacent rolls mounted in close rolling contact with the rolls to be supported. However, in the case of transverse corrugating rolls, where flutes project at intervals about the periphery of the rolls, such a system would have several undesirable features. A conventional hard back-up roll might tend to mush or wear down the fluted profile; and even if the surface of the supporting roll were to be provided with a resilient layer, a solid and continuous back-up could not be programmed easily to accommodate various degrees of separation forces and magnitudes of deflection along the width of the corrugating roll.

An even less satisfactory solution is to keep the rolls of a limited width consistent with their ability to remain stiff and uniform throughout for a given profile being corrugated into the material. This not only creates a limitation in respect to the actual physical dimensions which may be required in a given application, but also increases the cost of most high density sections made by this method. This is so because many high density honeycomb sections are produced most economically by cutting sections of desired size and shape from larger blocks made up of relatively wide ribbon sections. Moreover, where larger units of sections are desired, the small units may require subsequent joining, thus adding to the cost and decreasing the efficiency of the manufacture.

Thus, it is an object of this invention to provide means for minimizing the deflection of transverse corrugating rolls, thereby enabling such rolls to be adapted to accommodate relatively wide sections of material to be corrugated.

Another object of this invention is to provide restraining means for a pair of mating corrugating rolls in the form of several ring-shaped members mounted on either side of the corrugating rolls and in rolling contact therewith. The ring-shaped members on opposite sides of the corrugating rolls may be positioned in alignment with the longitudinal axes of the rolls and their line of contact with the material being corrugated thereby restraining the rolls in the direction opposite to maximum roll deflection.

A feature and an advantage of this invention is that by providing restraining means as described above, the corrugating rolls, which would otherwise be subject to bowing due to the separation forces created by the corrugating process, are forced to maintain relatively true alignment along their longitudinal axes. In this way the profile being impressed by the corrugating rolls remains relatively true throughout the entire width of the material being worked; consequently, rolls of relatively wide span may be employed to corrugate a wide range of material widths.

Another object of this invention is to provide ring-shaped members for the above described restraining means which have a resilient surface that may engage the corrugating rolls in rolling contact.

A feature and an advantage of the resilient surface is that the rolls may have imposed upon them a restraining force which is sufficient to minimize bowing during corrugation while at the same time injury to the corrugating flutes on the surface of said rolls is avoided.

Another object of this invention is to provide the above described ring-shaped members in the form of inflatable pneumatic tires; for example, ordinary automobile tires.

A feature and an advantage of embodying automobile tires in this invention is that the restraining force along the width of the corrugating rolls may be varied by increasing or decreasing the amount of air pressure in the tires. In this way a series of programmed or predetermined restraining forces may be imposed that are nearly proportional to the deflection or separation force present in the corrugating roll at a particular point of rolling contact with a restraining tire.

Another feature and an advantage of this invention is that by using variable pressure tires as restraining elements on the corrugating rolls, the entire system may be programmed to accommodate a variety of materials of differing thicknesses. In this way a single set of rolls of uniform diameter may be used in lieu, for example, of a family of crowned or barrel-shaped sets of corrugating rolls that would be required for most variations in material, thickness or width of section.

Numerous other objects, features and advantages will become apparent upon a reading of the following specification and by referring to the accompanying drawing wherein the same characters of reference in the several views correspond to the same component or element.

Turning now to the drawings, FIG. 1 is a partial elevation of a pair of corrugating rolls as embodied in some prior art devices.

FIG. 2 is a sectional view taken along line 2—2 of FIG. 1.

FIG. 3 is a partial side elevation in schematic form showing a corrugating device embodying the present invention.

FIG. 4 is a view taken along line 4—4 of FIG. 3.

This invention embodies the use of a series of ringlike members, such as rubber tires or the like, to restrain a pair of corrugating rolls from deflecting unduly when material is passed therebetween during the corrugating process. In one embodiment of this invention means are provided to apply varying degrees of restrain to the rolls proportional to the separating force imposed thereon in the region of the roll under the particular restraining means.

The invention is best understood by referring first to FIG. 1 which shows generally at A a set of corrugating rolls as they are normally disposed in respect to one another in accordance with some prior art devices. It should be noted, however, that in FIG. 1 the deflection between the rolls indicated by dimension 24 at the center thereof is somewhat exaggerated in order to better explain the application and utility of the present invention. Rolls 12 and 13 are provided with normal shaft extensions 12a and 12b, and 13a and 13b, respectively, each of which are rigidly yet rotatably mounted in a suitable and known manner not shown nor further described herein. (The shafts may be of the non-rotating type with the rolls mounted on bearings thereon.) Also, in accordance with conventional practice, either or both rolls 12 and 13 are power driven to rotate in the direction indicated by arrows 14 and 16 in order to corrugate sheets of suitable material such as metallic foil, plastic, and the like, as indicated at 17 between said rolls. The flutes of the rolls are not shown in FIG. 1 but are partially indicated in FIG. 2; flutes 12c, d and e are secured to roll 12 and flutes 13c, d and e to roll 13. The profile of the aforementioned flutes as viewed sectionally in FIG. 2 is typical although by no means the only form of profile that may be utilized. The particular corrugating shape that is produced can be seen in the sheet of material indicated at 17 and progressing in the direction of arrow 18 in FIG. 2. The corrugating action of the aforementioned flutes continuously forms the sheet at 17 into nodes 17a and 17b and connecting portions 17c and 17d.

In the prior art embodiment illustrated in FIGS. 1 and 2, the width of material being corrugated is indicated by dimension 19 and is purposely selected to illustrate a relatively wide transverse dimension relative to diameter 21 of the rolls. The corrugating action between the flutes of the rolls against the sheet indicated at 17 causes the deformation or creasing between nodes 17b, 17a and connecting portions 17c and 17d. This action, combined with the inherent interference and frictional drag of the material being deformed, produces reaction or separation forces indicated by arrows 22a, b, c, d , e, etc., in roll 12, and arrows 23a, b, c, d, e, etc., in roll 13; such separation forces in effect represent a distributed load imposed in equal and opposite directions along rolls 12 and 13. Since the rolls are mounted at each end by conventional bearings of either the fixed or rotating type, or the like, the two rolls may be viewed as a pair of fixed beams upon which are imposed a distributed load. As is well understood in the structural engineering art, such a load results in a distributed bending moment throughout each of the rolls. Assuming a relatively uniform distribution thereof, such a moment produces deflection of the rolls which reaches a maximum at about the mid point thereof as indicated by dimension 24. For purposes of clarity, this deflection has been shown somewhat exaggerated in FIG. 1; however, it is well known that successful corrugation of various ribbon materials for honeycomb products depends upon the flatness of the sheet which can be maintained by the corrugating device. In the case of a roll corrugating stand, such as that indicated in FIG. 1, even relatively minor bowing of the rolls will create slight differences in the depth of corrugation across the width of the web. Such differences, slight though they may be, are sufficient to cause bellying in the web. This will not permit the sheet, after it is cut, to lie perfectly flat; and hence good bonding when laying up a standard honeycomb block may become extremely difficult it not impossible to achieve.

To overcome such difficulties, and to achieve the various other objects, features and advantages referred to at the beginning of this specification, this invention proposes to use of certain novel structure that is best understood by first referring to FIG. 3. At B there is indicated generally a conventional unwinding stand holding roll 112 which feeds a continuous length of sheet material 117, having a width 119, in the direction of arrows 118. C generally indicates in schematic form various stages of cleaning and tension adjustment which may be required to a given process preparatory to the actual step of corrugating. Since the various details at B and C are well known in the art of honeycomb manufacture, they are not further described herein nor shown in the accompanying drawing.

At D there is indicated a station for corrugation of material 117 similar in some respects to that indicated at A in FIGS. 1 and 2. A pair of corrugating rolls 112 and 113, similar in respect to dimensions and corrugation fluting to rolls 12 and 13, are shown rotatably mounted between a plurality of restraining rings indicated generally at E and F. The corrugation of material 117 between rolls 112 and 113 produces a similar pattern of nodes and connective surfaces as described above in respect to FIGS. 1 and 2; and separation forces 122a, 122b, 122c, etc., and 123a, 123b, 123c, etc., are produced thereby in rolls 112 and 113, respectively. Deflection or bowing of rolls 112 and 113 is in large part overcome or minimized, however, by the ring-shaped restraining means mentioned above and indicated generally at E and F. Since the various elements present in both sets of such restraining means are substantially identical, the more detailed description which follows of those shown generally at E are understood to apply also to those at F, even where no specific reference to the latter is made.

A pair of shafts 126 are mounted in spaced parallel relationship on either side of rolls 112 and 113. The mounting details of these shafts are well known in the mechanical arts and hence are not described herein nor shown on the drawing. It is to be noted, however, that such shafts may be of either the fixed or rotating type depending upon whether the restraining means or ring-shaped members, described in greater detail below, are themselves rotatably mounted on the shaft (in which case the shaft itself may be fixed) or fixedly secured to the shaft (where the shaft is rotatably mounted at its end securing points). The diameter of shafts 126 may be uniform, as shown, or stepped to increasing diameters toward the center thereof. In either case, the shaft section is selected to have sufficient stiffness along its longitudinal axis to resist the loads imposed upon it by the restraining members without exhibiting significant deflection.

A series of restraining means are generally indicated at 127 and comprise ring-shaped members 128 supported on rims 129 which in turn are secured by their hubs 131 to shaft 126. The latter details, and those associated therewith that follow in this specification, are understood to be present in substantially similar form in each of the restraining means generally indicated by the numerals 127. The securing of hubs 131 to shaft 126 may be either of the fixed type, if shafts 126 rotate, or of a suitable anti-friction type mount with collars or other such devices to prevent lateral motion along the shafts, if the shafts themselves are stationary.

The restraining means indicated at 127 and ring-shaped members 128 are selected so that the surfaces of the ring-shaped members are in good rolling contact with rolls 112 and 113; and shafts 126 are positioned so that the center of rotation of the restraining members is in nearly direct alignment with the line of contact 132 of material 117, between rollers 112 and 113, and longitudinal axes 133 and 134, respectively, of said rolls. In this way the rolling points of contact 136 of ring-shaped members 128 on rolls 112 and 113 may be made very nearly coincident with the lines of separation forces 122a, b, c, etc., and 123a, b, c, etc., along the surface of rolls 112 and 113, respectively. In this manner the deflection or separation forces 122a, b, c, etc., and 123a, b, c, etc., are resisted by the restraining members indicated at 127 acting in combination with stiff shafts 126. Consequently, deflection that may arise as a result of such forces, similar to deflection 24 explained earlier in this specification in respect to many prior art devices exemplified by FIGS 1 and 2, is greatly minimized if not eliminated.

It has been found satisfactory in the practice of this invention to use conventional pnuematic tires for the ring-shaped members 128. Such usage has several advantages. The rubber surface of the tires is somewhat resilient and of a generally pliable nature. Thus, when the tires are in rolling contact with the currugating rolls, likelihood of injury to the fluites, which protrude peripherally about the roll, is virtually eliminated. Moreover, since the deflection of the rolls is greatest near the center thereof, the pneumatic tires located near that region may be inflated (by conventional tubed or tubeless means not shown on the drawings or described in further detail herein) to a higher air pressure thus exerting a greater reactive force at that point of contact with the roll. Another way of expressing this feature is that the air pressure or restraining members' reactive forces may be programmed along the width of the corrugating rolls to create counter bending moment in the rolls equivalent to that being created by the corrugating action.

When a material having a different gauge or thickness than that of section 117 is to be corrugated between rolls 112 and 113 (assuming that the flute profiles are otherwise suitable), a new set of rolls need not be installed to compensate for the increased (or decreased) separation forces. Using the novel combination of this invention, it is merely necessary, under most circumstances, to vary the air pressure in the pneumatic tires. Thus, the need for different rolls or barrel-shaped roll sets is generally overcome.

It should be noted that although the restraining members indicated at 127 are shown in nearly equal spaced relationship, other arrangements may be used. For example, these members and their associated ring-shaped members 128 may be spaced at unequal intervals or in staggered relationship between one another. This may partly be determined by the type of material being corrugated through the rolls and the nature of the deflection pattern. In some instances it may be possible to use but a single restraining means indicated at 127 on one or both shafts 126. Also, in those cases where one of the rolls may have a somewhat larger diameter than the other, restraining member or members may only be required in rolling contact with one of the rolls.

It is also possible, in the practice of this invention, to utilize a unitary restraining member with surface variations to accomplish the various programming functions described earlier; and, in some instances, the restraining means may be in the form of a single resiliently surfaced back-up roll.

Although earlier reference has been made to corrugating rolls driven by conventional means, it may be possible, under certain circumstances, to combine the driving of the corrugating rolls with the novel restraining members proposed herein.

The novel structure described above in some detail is thus understood to minimizes, if not eliminate, the bowing or deflection normally encountered in corrugating rollers, particularly those used in the manufacture of relatively wide material widths, relatively high cell densities, and/or using heavier gauge materials. By means of this improved apparatus for corrugating various types of material, material such as that shown by ribbon 117 in the accompanying drawing is generally found to have a more uniform, sharply defined helf cell profile corrugated therein than those of similar shape and profile, exemplified by the material indicated at 17, made by means of many prior art corrugating techniques. The novel structure proposed herein is generally achieved without the necessity of changing corrugating roll sets or employing other relatively costly and inefficient procedures as outlined earlier in this specification.

Although the invention herein has been described in some detail in respect to one embodiment, this has been done by way of example and for purposes of clarity. It is understood that various mechanical modifications may be made within the spirit of this invention and scope of appended claims.

What is claimed is:

1. Apparatus for the manufacture of honeycomb, utilizing a pair of closely spaced corrugating rolls adapted to corrugate transversely formable sheet material conveyed between said rolls, comprising: pneumatic restraining means rotatably mounted adjacent to said pair of corrugating rolls to impose a force thereon about equal and opposite to the separation force exerted by the corrugating rolls; and support means mounted in said restraining means to cause said restraining means to maintain a relatively constant position in respect to said corrugating rolls and cause the rolls to corrugate transversely in relatively true and constant alignment.

2. A device to minimize deflection in a pair of transverse corrugating rolls adapted to corrugate sheet material conveyed therethrough, comprising in combination: a plurality of ring-shaped pneumatic members rotatably mounted on opposite sides of said pair of corrugating rolls and each having a peripheral surface in rolling contact with a portion of the adjacent corrugating roll, the centers of rotation of said members being in alignment with the centers of said rolls and the line of contact between the rolls and said sheet material conveyed therethrough; and means associated with each of said ring-shaped members to increase and decrease the circumference of each said peripheral surface and cause each ring-shaped member to impose a restraining force on said portion of the adjacent corrugating roll proportional to the separation force exerted against said portion of the roll during the corrugation of said material, whereby the corrugating rolls are maintained in relatively straight longitudinal alignment.

3. The device in accordance with claim 2 and wherein said ring-shaped pneumatic members comprise inflatable rubber tires and said means associated with each of said ring-shaped members comprises means to increase and decrease the air pressure within each of said rubber tires and cause said imposed restraining force to be programmed to the gauge and composition of said sheet material being conveyed therethrough.

4. In the corrugation of formable sheet material to form a continuous profile of honeycomb half cells by means of a pair of corrugating rolls adapted to impress said profile on said sheet material as the latter is conveyed between said rolls, the apparatus comprising in combination: a first shaft and a second shaft mounted in spaced parallel relationship to said pair of rolls and on opposite sides thereof, said shafts being in near alignment with the longitudinal axes of said rolls; and a plurality of first resilient ring-shaped pneumatic members rotatably mounted on said first shaft, spaced apart from each other and in rolling contact with one of said rolls, and a plurality of second resilient ring-shaped pneumatic members rotatably mounted on said second shaft, spaced apart from each other, and in rolling contact with the other of said rolls, whereby the resilient ring members impose restraint upon said pair of rolls and force the rolls to maintain relatively constant axial alignment when corrugating said material therebetween.

5. The apparatus as defined in claim 4 and wherein further said first resilient ring-shaped pneumatic members and said second resilient ring-shaped pneumatic members comprise inflatable rubber tires.

6. Apparatus for the manufacture of honeycomb, utilizing a pair of closely spaced corrugating rolls adapted to corrugate transversely formable sheet material conveyed between said rolls, comprising: pneumatic restraining means rotatably mounted adjacent to said pair of corrugating rolls to impose a force thereon about equal and opposite to the separation force exerted against the corrugating rolls by said formable sheet material during corrugation; and means associated with said restraining means for maintaining said restraining means in a relatively constant position with respect to said corrugating rolls to cause the rolls to produce transverse corrugations that are of relatively true and constant alignment.

References Cited

UNITED STATES PATENTS

| 1,785,986 | 12/1930 | Speer et al. | 29—18 |
| 2,673,168 | 3/1954 | Pascoe et al. | 156—582 X |
| 3,253,323 | 5/1966 | Saueressig | 29—113 |

EARL M. BERGERT, *Primary Examiner.*

H. F. EPSTEIN, *Assistant Examiner.*